W. T. NEIL.
Wagon-Standards.
No. 146,700.
Patented Jan. 20, 1874.
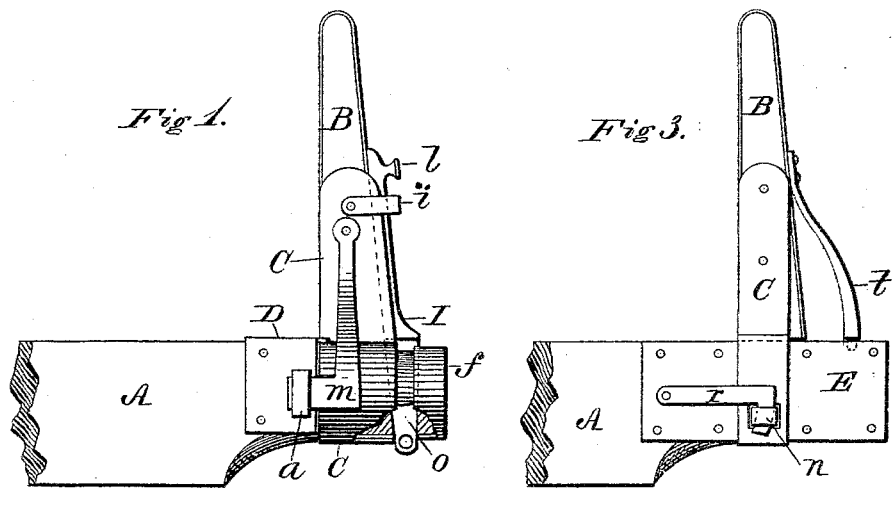
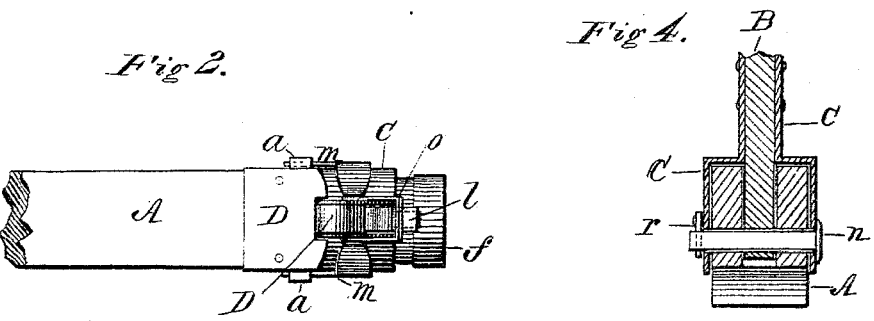

UNITED STATES PATENT OFFICE.

WILLIAM T. NEIL, OF BAINBRIDGE, OHIO, ASSIGNOR OF ONE-HALF HIS RIGHT TO EDWIN S. JONES, OF SAME PLACE.

IMPROVEMENT IN WAGON-STANDARDS.

Specification forming part of Letters Patent No. 146,700, dated January 20, 1874; application filed October 18, 1873.

*To all whom it may concern:*

Be it known that I, WILLIAM T. NEIL, of Bainbridge, in the county of Ross and State of Ohio, have invented certain Improvements in Wagon-Standard, of which the following is a specification:

My invention relates to wagons; and it consists in so constructing and arranging the standards or stakes that they can be detached from the bolster at once, and replaced with but trifling loss of time, and without the use of tools, as hereinafter explained.

Figure 1 is a side elevation of one end of a bolster with my improvement applied. Fig. 2 is a top plan view of the same. Figs. 3 and 4 represent modifications of the same.

It is very desirable oftentimes, in hauling logs, timber, and similar articles, on wagons, carts, or trucks, to have the standards or stakes so arranged that they can be readily removed for convenience in loading or unloading the articles.

To accomplish this result, I construct the bolster and stake as represented in Figs. 1 and 2, in which—

A indicates the bolster, and B the stake. The outer end of the bolster I make round, and secure upon its outer end a band or ring, $f$, to strengthen it, and prevent splitting. To the top and sides of the bolster, just inside of where the stake is to be, I secure a metal plate, D, as shown in Figs. 1 and 2; this plate being notched at its center, on top, at its edge next to the stake B, as shown in Fig. 2, the stake, when in place, fitting or resting in this notch, which helps to hold it upright, and prevent it from turning over. I then take a flat strap of metal and bend it at its center, so as to form a socket to fit the rounded end of the bolster, while the ends of this strap C are extended up along the opposite sides of the stake B for half or two-thirds of its length, as shown in Fig. 1, it being securely bolted or riveted to the stake, and having its edge extending back beyond the outer edge of the stake a short distance, as indicated by the dotted lines in Fig. 1. I then provide a bar of metal, I, of the proper width, to slide freely up and down between these projecting edges of the plate C, on the lower end of which I form a wedge-shaped tenon, $o$, to fit into a corresponding mortise made in the rounded arm of the bolster, on a line with the outer edge of the stake, this bar being provided, near its upper end, with a knob or hook, $l$, by which to slide it. Near the upper end of this bar I, which may be properly termed a key, I secure to the stake a loop, $i$, which incloses the key, and fastens it to the stake, but leaves it free to be moved vertically. As an additional means of security, I secure to the opposite sides of the stake B a brace, $m$, the lower end of which is bent at a right angle, so as to engage in a loop or staple, $a$, secured to the sides of the bolster, as shown in Figs. 1 and 2.

When thus constructed, it will be seen, that in order to detach the stake from the bolster it is only necessary to raise the key I out of its mortise, and slide the stake off from the end of the bolster, and to replace it the operation is reversed.

As shown in Fig. 1, the key I may project below the bolster, and have a hole in its lower end to receive a bolt, to prevent it from being accidentally raised, the bolt being secured to the bolster by a small chain or cords to prevent being lost. This, however, will be used only when traveling over rough places, or in going long distances.

In Figs. 3 and 4 I have represented a modification of the device, more especially intended to adapt my improvements to wagons already made.

In Fig. 1, the bolster is represented as having a metal plate or strap, E, secured to its sides, and passing around the end, as is usual in ordinary wagons. The stake B is also represented as having a brace, $t$, attached to its outer edge, the lower end of which fits loosely into a socket made for it in the top of the bolster, which is also covered with a metal plate, and on which the shoulders of the brace $t$ rest. It is also represented with the ordinary side straps or braces C made somewhat wider and longer than usual, and having a hole through their lower ends, in line with a corresponding hole through the bolster, as shown in Fig. 2. A bolt, $n$, is fitted in this hole, with a head on one end, and having its opposite end extending through far enough to permit a latch or hook, r, to engage in a hole in its end, the hook or latch being pivoted to the side of the bolster A, as shown in Fig. 3. The lower end of the stake fits into a suitable mortise in the bolster, as represented in Fig. 4, and which, with lower end of the stake, should be slightly beveled to enable the stake to be removed with ease.

It will be seen that by this modification my improvement can be readily applied to existing wagons with but slight alteration, and with but little expense. In constructing new wagons, however, I prefer the plan previously described, and as represented in Figs. 1 and 2.

It is obvious that my improvements may be applied not only to farm or road wagons, but also to the heavy truck-wagons and carts used in cities and elsewhere. It is especially useful in wagons used for hauling iron bars, railway-rails, and the like.

It is likewise obvious that the plan represented in Figs. 1 and 2 may be used, and the end of the bolster left square by simply bending the plate C so as to form a square instead of a round socket.

I am aware that a wagon-stake has been secured to a plate, which is hinged to the side of the bolster, so it can be turned over sidewise, and that stakes have been attached to cars by a metal socket, so that they can be lifted out the same as an ordinary sled-stake; and, therefore, I do not claim such; but What I do claim is—

1. In combination with the bolster A, the detachable stake B, having the metal plate C secured thereto, and made to clasp the end of the bolster, substantially as described.

2. The stake B, having the metal plate C rigidly attached, and the sliding key I, in combination with the bolster A, all constructed to operate as set forth.

3. In combination with the bolster A and detachable stake B, the hooks m and staples a, all constructed to operate substantially as set forth.

WILLIAM T. NEIL.

Witnesses:
A. S. JONES,
GEORGE W. CLARK.